United States Patent [19]
Baumann et al.

[11] Patent Number: 5,884,940
[45] Date of Patent: Mar. 23, 1999

[54] HEIGHT-ADJUSTABLE SAFETY BELT FASTENING SYSTEM COUPLED TO THE VEHICLE SEAT MOVEMENT

[75] Inventors: Jan Baumann, Uetersen; Reinhard Flössel, Elmshorn; Thomas Möller, Hamburg; Birte Wermann, Pinneberg, all of Germany

[73] Assignee: Autoliv Development AB, Vargarda, Sweden

[21] Appl. No.: 852,734

[22] Filed: May 7, 1997

[30] Foreign Application Priority Data

May 7, 1996 [DE] Germany ................. 196 18 302.2

[51] Int. Cl.$^6$ ................................. B60R 22/20
[52] U.S. Cl. ............. 280/801.2; 280/802; 280/808; 297/483
[58] Field of Search ................ 280/801.2, 808, 280/802; 297/468, 483

[56] References Cited

U.S. PATENT DOCUMENTS

| | | | |
|---|---|---|---|
| 4,135,737 | 1/1979 | Scholz et al. | 280/801.2 |
| 4,173,357 | 11/1979 | Jahn et al. | 297/483 |
| 5,628,529 | 5/1997 | Golz et al. | 280/808 |

FOREIGN PATENT DOCUMENTS

| | | | |
|---|---|---|---|
| 221297 | 5/1987 | European Pat. Off. | 280/801.2 |
| 277550 | 8/1988 | European Pat. Off. | 280/801.2 |
| 2625417 | 12/1977 | Germany . | |
| 2651037 | 5/1978 | Germany | 280/801.2 |
| 2834837 | 2/1980 | Germany . | |
| 4018294 | 12/1991 | Germany . | |
| 2027333 | 2/1980 | United Kingdom | 280/801.2 |

*Primary Examiner*—Eric D. Culbreth
*Attorney, Agent, or Firm*—Robert W. Becker & Associates

[57] ABSTRACT

A height-adjustable fastening system for a safety belt of a vehicle has a guide track and a slide slidably connected to the guide track and arrestable in various positions along the guide track. A fastening or guiding bracket is connected to the slide. A Bowden cable arrangement has a first end connected to the slide and a second end connected to a vehicle seat displaceable on a first and second seat tracks. The Bowden cable arrangement includes a sleeve and a cable pull displaceably guided within the sleeve. A stationary guide is positioned in the vicinity of the first seat track. The Bowden cable arrangement is guided about the stationary guide and the sleeve is connected to the stationary guide. The cable pull is connected with a first end to the vehicle seat at a fastening location remote from the stationary guide. The cable pull transmits a displacement movement of the vehicle seat onto the slide. The fastening location and the stationary guide are arranged such to one another that in a first end position of the vehicle seat the cable pull extends at a first angle of 90° or less to the seat tracks and in a second end position of the vehicle seat extends at a second angle of 0° or more to the seat tracks.

7 Claims, 4 Drawing Sheets

HEIGHT-ADJUSTABLE SAFETY BELT FASTENING SYSTEM COUPLED TO THE VEHICLE SEAT MOVEMENT

BACKGROUND OF THE INVENTION

The invention relates to a height-adjustable fastening or guiding bracket for a safety belt of a vehicle. On a guide track connected to the vehicle a slide is connected that is longitudinally displacable along the guide track and arrestable in different height positions. The height-adjustable slide supports the fastening or guiding bracket for the safety belt and is connected with a Bowden cable arrangement for transmitting pulling and/or pressure forces to the vehicle seat. The Bowden cable arrangement couples the displacement of the slide to the movement of the vehicle seat.

A height-adjusting mechanism of the aforementioned kind is known from German Patent Application 40 18 294. The arrangement disclosed therein shows a horizontal adjusting movement of the vehicle seat transmitted via a Bowden cable arrangement onto the fastening or guiding bracket at the slide of the height-adjusting mechanism. The displacement of the vehicle seat is to be taken into consideration within the adjusting range of the seat because, according to the representation in German Patent Application 40 18 294, in the forward, in the central, and in the rearward area of the respective adjusting range of the seat different respective height adjustments of the fastening or guiding bracket are required. In principle, the known arrangement is already based on a reducing or step-down transmission of the seat displacement stroke in relation to the displacement stroke for the fastening or guiding bracket coupled thereto. With the known arrangement it is disadvantageous that a complicated embodiment of the Bowden cable arrangement coupling the displacement movement of the vehicle seat to the height-adjusting device is required.

It is therefore an object of the present invention to provide a height-adjusting mechanism of the aforementioned kind which is constructively simple but functionally reliable.

SUMMARY OF THE INVENTION

A height-adjusting fastening system for a safety belt of a vehicle according to the present invention is primarily characterized by:

A guide track;

A slide slidably connected to the guide track and arrestable in various positions along the tracks;

A fastening bracket connected to the slide;

A Bowden cable arrangement having a first end connected to the slide and a second end connected to a vehicle seat displaceable on a first and a second seat tracks;

The Bowden cable arrangement comprising a sleeve and a cable pull cable displacably guided within the sleeve;

A stationary guide positioned in the vicinity of the first seat track;

The Bowden cable arrangement guided about the stationary guide;

The sleeve connected to the stationary guide;

The cable pull connected with a first end to the vehicle seat at a fastening location remote from the stationary guide;

The cable pull transmitting a displacement movement of the vehicle seat onto the slide;

The fastening location and the stationary guide being arranged such to one another that in a first end position of the vehicle seat the cable pull extends at a first angle of 90° or less to the seat tracks and in a second end position of the vehicle seat extends at a second angle of 0° or more to the seat tracks.

The fastening location at the vehicle seat is preferably in the area of the second seat track.

The stationary guide is displacable in the direction defined by the first seat track and is stationarily securable for performing a displacement movement of the vehicle seat.

Advantageously, the fastening location is a holder secured to the vehicle seat and extending parallel to the second seat track.

The holder is preferably adjustable on an axis extending perpendicularly to the second seat track and is arrestable in a selected position.

The stationary guide is opened toward the fastening location and is funnel-shaped in order to accommodate positioning of the cable pull in the first and second end positions and in displacement positions between the first and second end positions.

The stationary guide has a shape of a right-angle triangle, wherein one leg of the triangle extends at a right angle to the first seat track and is correlated with the extension of the cable pull in the first end position and wherein a hypotenuse of the triangle is correlated with an extension of the cable pull in the second end position.

The slide preferably extends upwardly and has at an upper end thereof a guide pulley. The Bowden cable arrangement extends from the vehicle seat to the guide pulley, is guided about the guide pulley, and is connected to the slide. The first end position is a forward position of the vehicle seat and the first angle is 90°. An angle between the cable pull and the seat tracks decreases when the vehicle seat is displaced rearwardly into the second end position.

The slide extends upwardly and the Bowden cable arrangement extends from the vehicle seat to a lower end of the slide to which it is connected. The first end position is a rearward position of the vehicle seat and the first angle is 90°. The angle between the cable pull and the seat tracks decreases when the vehicle seat is displaced forwardly into the second end position.

The present invention is based on the principle that the Bowden cable pull is guided about a stationary guide which is mounted within an area adjacent to one of the seat tracks of the adjustable seat. The sleeve of the Bowden cable arrangement is supported at the stationary guide and the end of the Bowden cable pull is connected remote from the stationary guide at the adjustable seat. The stationary guide and the fastening location of the cable pull of the Bowden cable arrangement are arranged to one another such that in the two end positions of the adjustable vehicle seat the Bowden cable pull extends at an angle of 90° or smaller, respectively, equal to 0° or greater than 0° relative to the seat tracks. Thus, the inventive solution is advantageously especially simple with respect to its construction because in addition to the stationary guide connected to the vehicle no additional components are required for mounting the Bowden cable. Furthermore, by aligning the stationary guide, on the one hand, and the fastening location of the Bowden cable pull at the seat, on the other hand, substantially any desired transmission ratio can be realized as a function of the respectively fastening adjusting travel of the slide within the height-adjusting fastening system.

According to one embodiment of the invention, the end of the Bowden cable pull is connected to the adjustable seat in the area of the seat track opposite the stationary guide. In this embodiment the entire width of the seat is used so that a correspondingly great adjusting travel for the slide of the height-adjusting arrangement is provided.

An individual adjustment of the height-adjusting travel of the fastening or guiding bracket is provided in that the stationary guide is adjustable in different positions along an axis coinciding with the seat track and can be stationarily arrested for the purpose of adjusting the seat and the slide of the height-adjusting mechanism. For the actual adjusting step a stationary guide for the Bowden cable arrangement is thus provided. On the other hand, with the individually possible change of the position of the stationary guide relative to the fastening location of the Bowden cable arrangement at the vehicle seat, the transmission ratio can be selected as desired.

In regard to the arrangement of a fixed fastening location of the Bowden cable arrangement at the seat and the stationary guide, the end of the Bowden cable arrangement may be fastened to a holder which is connected to the adjustable seat and extends parallel to the seat tracks for the purpose of adjusting a constant transmission ratio. By arranging an additional holder in the area of the vehicle seat, the spacing of the fastening location of the Bowden cable arrangement to the stationary guide is reduced so that upon adjusting of the seat the relative displacement of the fastening location of the Bowden cable arrangement relative to the position of the stationary guide is reduced. This results in a smaller displacement stroke for the slide of the height-adjusting mechanism.

In order to allow in an embodiment with a holder for an individual adjustment of the transmission ratio, it may be provided that the holder is adjustable on an axis extending perpendicular to the second seat track and is arrestable in selected positions.

According to one embodiment of the invention it is suggested that the stationary guide is embodied as a funnel-shaped element that is open toward the fastening location of the Bowden cable arrangement and allows positioning of the Bowden cable pull within the stationary guide according to the respective angular positions (including first and second end positions and any intermediate displacement position) of the cable pull relative to the seat tracks. With the funnel-shaped embodiment, the funnel surfaces provide an abutment and a guiding action for the Bowden cable pull in the two end positions of the seat so that an excellent transmission of the displacement movement via the Bowden cable arrangement is ensured without the risk of jamming.

It may especially be provided that the funnel-shaped element has the shape of a right-angle triangle whereby one leg corresponds to the extension of the Bowden cable pull in one of the end positions of the seat and extends at a right angle to the seat tracks and whereby the hypotenuse corresponds to the course of the Bowden cable pull in the other end position of the vehicle seat.

According to one embodiment of the invention, the Bowden cable is guided from the displaceable seat to a guide pulley positioned at the upper end of the height-adjusting mechanism. It is guided about the guide pulley and then connected to the slide. In this embodiment the angle between the adjusting device (seat tracks) of the seat and the portion of the Bowden cable pull extending between the two seat tracks decreases from the maximum angle of 90° in the forward position of the seat when the seat is displaced to the rear.

In the alternative, it may be provided that the slide of the height-adjusting mechanism is loaded (biased) by a spring acting thereon from the top and that the Bowden cable pull engages the lower end of the slide and displaces the slide against the force of the spring. In such an embodiment a guide pulley is no longer needed. In this arrangement, the Bowden cable pull extends at an angle of 90° relative to the seat track in the rear position of the vehicle seat and this angle is reduced upon displacement of the seat in the forward direction.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
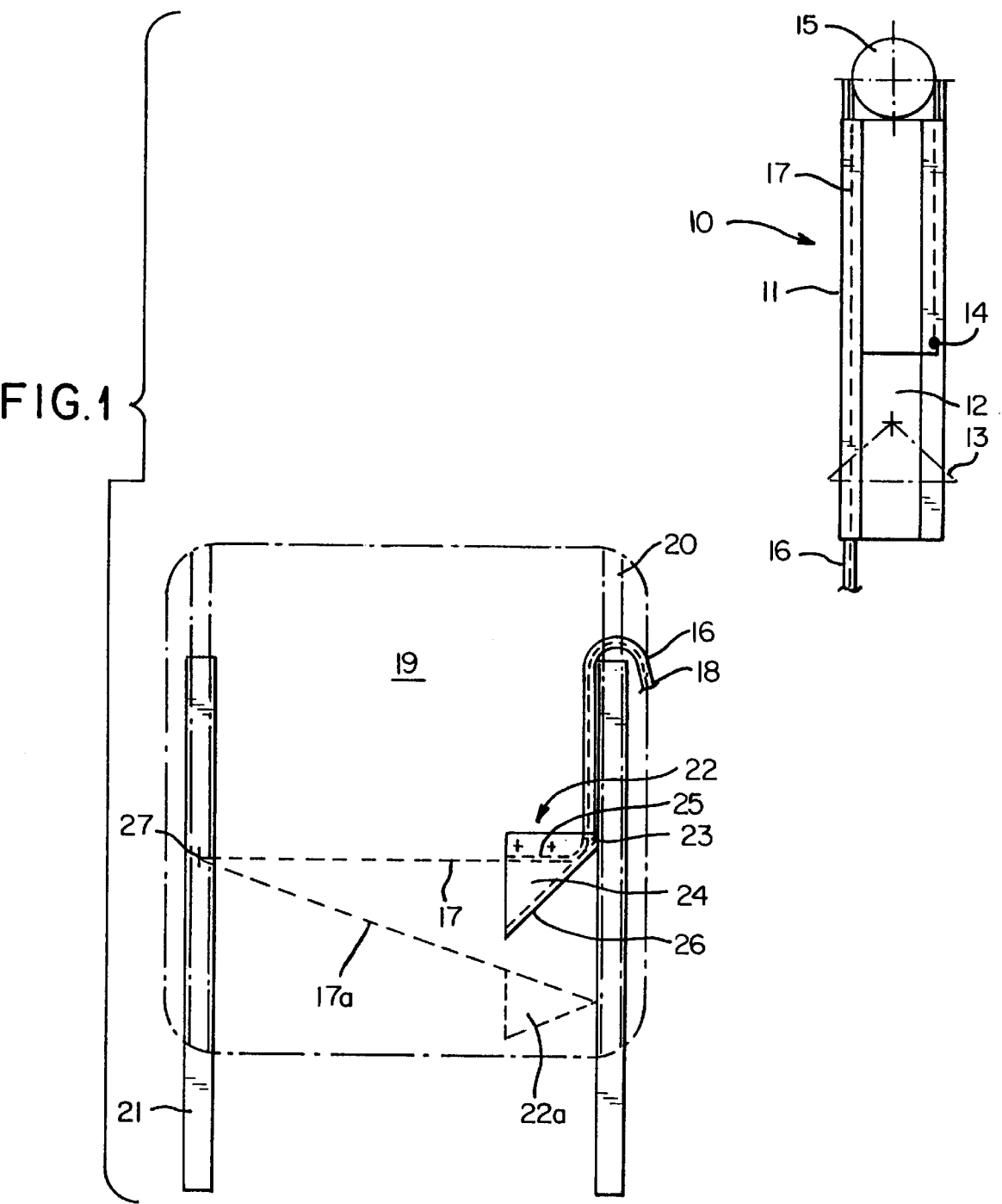
FIG. 1 schematically shows a plan view of an adjustable seat in the forward position with a vertically positioned height-adjusting mechanism in a side view coupled to the seat by a Bowden cable arrangement via a guide pulley at the slide.

The present invention will now be described in detail with the aid of several specific embodiments utilizing FIGS. 1 through 4.

The seat belt fastening system includes a height-adjustment mechanism indicated with reference numeral 10. It is comprised of a track 11 on which a slide 12 is longitudinally displacable and to which is connected a fastening or guide bracket 13. In the position represented in FIG. 1, the slide 12 is in its lowermost position so that an upwardly oriented displacement stroke (adjustment travel) is possible.

One end of the Bowden cable pull cable 17 of a Bowden cable arrangement 16 is connected to the slide 12 at suspending location 14. The Bowden cable arrangement 16 is guided about a guide pull 15 positioned at the upper end of the slide 12 and is then further guided toward the vehicle seat 19 arranged on seat tracks. In the area of the seat track 20 of the adjustable seat 19 facing the height-adjusting mechanism 10, a stationary guide 22 is fastened to the vehicle, respectively, to the seat track 20. The stationary guide 22 comprises a support 23 for the sleeve 18 of the Bowden cable arrangement 16. The Bowden cable pull 17 is guided through the stationary guide 22 and is connected to the seat 19 at a fastening location 27 in the area of the oppositely arranged guide rail 21. To prevent snagging, the stationary guide 22 is embodied as a right-angle triangle-shaped funnel 24. One leg 25 extends at a right angle to the axis of the seat tracks 20, 21 so that a corresponding course of the Bowden cable pull 17 between the stationary guide 22 and the fastening location 27 results in the position shown in FIG. 1 (the forward most position of the seat). The hypotenuse 26 of the triangular funnel 24 is embodied such that the Bowden cable pull 17 in the rearmost position shown in FIG. 2 extends directly into the funnel 24 open toward the fastening location 27. When the seat is displaced from the forward position shown in FIG. 1 into the rearward position shown in FIG. 2, the end of the Bowden cable pull 17 connected to the fastening location 27 is moved with the seat 19 while the support of the sleeve 18 at the stationary guide 22 remains stationary. The end of the cable pull 17 projecting from the stationary guide 22 is thus extended so that a corresponding pulling movement in the direction toward the guide pulley 15 results which is transmitted to the slide 12 of the height-adjustment mechanism 10 so that the slide 12 with the fastening or guide bracket 13 for the safety belt is moved upwardly. As can be seen from the geometric conditions when comparing FIGS. 1 and 2, the transmission ratio of the seat displacement stroke to the adjustment travel for the slide results as a function of the distance of the fastening location 27 to the stationary guide 22 as well as of the displacement stroke of the seat 19 between the forward and rearmost position. The distance between the fastening location 27 and the stationary guide 22 can be varied easily by providing a holder at the seat 19 which is positioned at a minimal distance to the stationary guide 22 and provides the fastening location for the Bowden cable pull 17.

Figure 2:
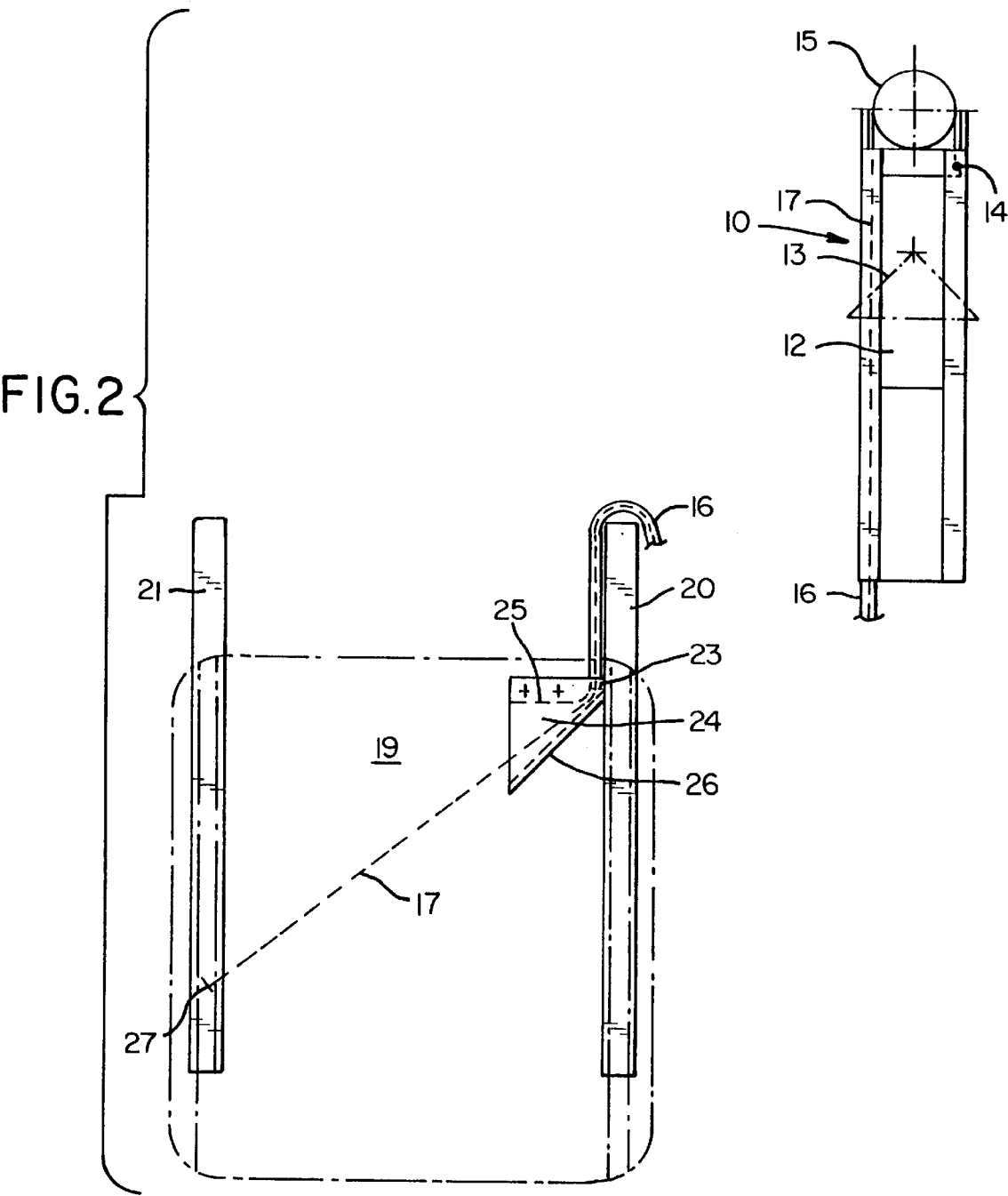
FIG. 2 shows the arrangement of FIG. 1 with the vehicle seat in the rearward position.
Figure 3:
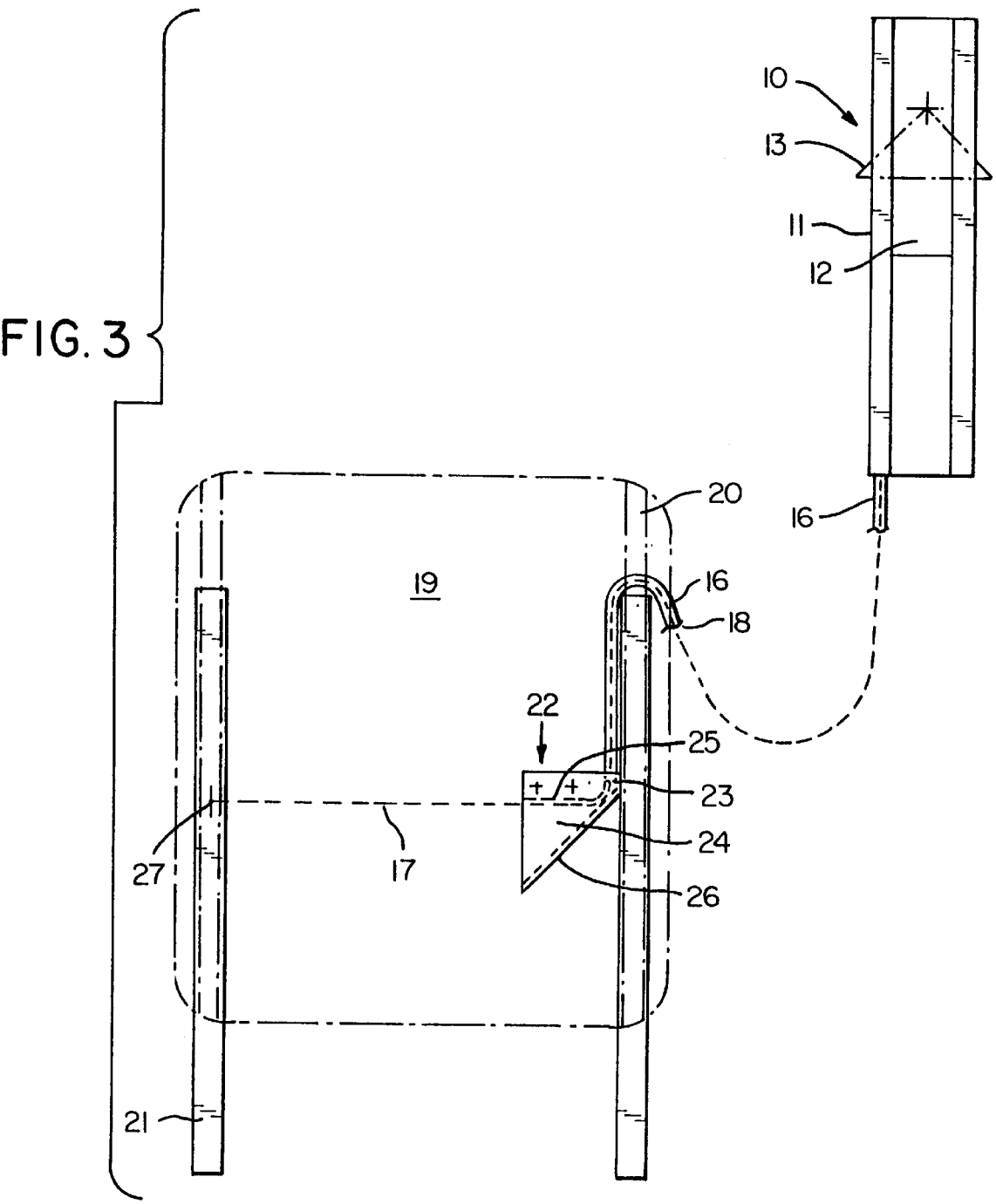
FIG. 3 schematically shows an embodiment of an adjustable seat in a rearward position with a height-adjustment mechanism coupled thereto via a Bowden cable arrangement fastened to the slide; in a view similar to FIG. 1
Figure 4:
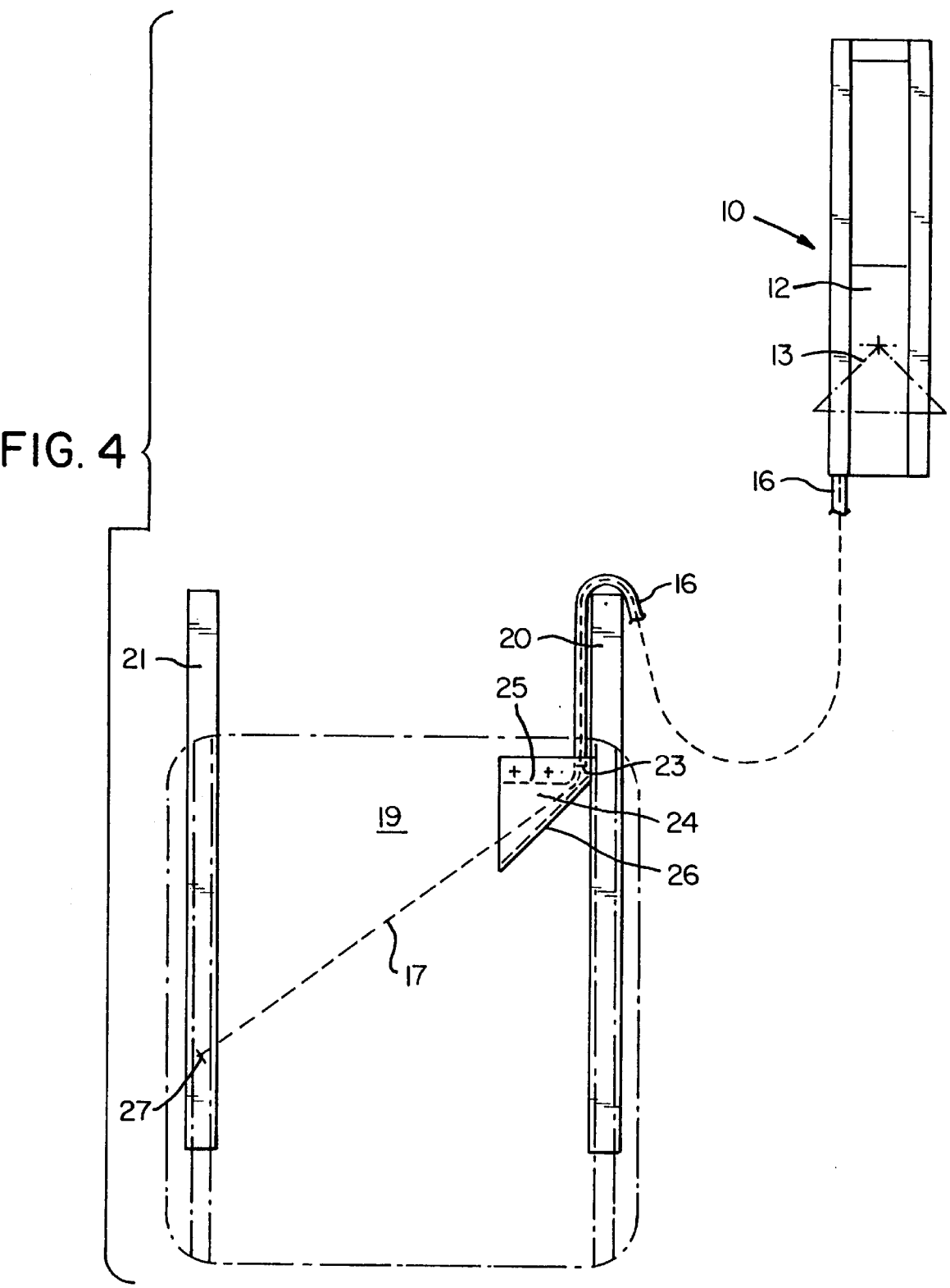
FIG. 4 shows the arrangement of FIG. 3 with the seat in a forward position.

An alternative coupling of seat 19 and height-adjusting mechanism including slide 12 is shown in FIGS. 3 and 4. In contrast to the embodiment explained in connection with FIGS. 1 and 2, the Bowden cable arrangement of the embodiment of FIGS. 3 and 4 is guided, coming from the adjustable seat 19, to the lower end of the slide 12 of the height-adjusting mechanism and the Bowden cable pull 17 is directly connected to the slide 12. In comparison to the embodiment of FIGS. 1 and 2 the Bowden cable pull is not deflected and in the embodiment of FIGS. 3 and 4 a reversal of the movement and angular ratios in comparison to the embodiment of FIGS. 1 and 2 is to be observed. In order to allow comparison between the embodiments, the same representation as in FIGS. 1 and 2 has also been selected for FIGS. 3 and 4. However, in the representation of FIG. 3 the seat 19 is in the rearward position and in the representation of FIG. 4 the seat 19 is in the forward position. This is also evidenced by the slide 12 in FIG. 3 for the shown seat position being positioned in the uppermost position of the height-adjusting mechanism, which corresponds to the rearward seat position, while in FIG. 4 the slide 12 is shown in the lower position of the height-adjusting device, corresponding to the forward seat position. In FIG. 3, showing the rearward seat position, the angle of 90° between the displacement device (seat tracks) of the seat and the portion of the cable pull 17 between the two seat tracks is shown whereby this angle is reduced upon seat displacement into the forward seat position.

It is also possible to individually adjust the relationship between the displacement stroke of the seat adjustment and the displacement stroke of the fastening or guiding bracket connected to the slide. This is possible by either displacing the stationary guide, for example, manually, in the direction of the seat track so that as a function of the position of the stationary guide to the fastening location of the Bowden cable pull a different geometry will result which, in comparison to the shown embodiment of a right-angle triangle, can be a pointed triangle 22a schematically shown in phantom lines with the cable 17a extending from the fastening location to the triangle 22a. Alternatively, the fastening location of the Bowden cable pull at the seat may be adjustable transverse to the seat tracks while the stationary guide remains in place. This also results in a different geometry.

The present invention is, of course, in no way restricted to the specific disclosure of the specification and drawings, but also encompasses any modifications within the scope of the appended claims.

What we claim is:

1. A height-adjustable fastening system for a safety belt of a vehicle, said fastening system comprising:

a guide track;

a slide slidably connected to said guide track and arrestable in various positions along said guide track;

a fastening bracket connected to said slide;

a Bowden cable arrangement having a first end connected to said slide and a second end connected to a vehicle seat displaceable on a first and a second seat tracks;

said Bowden cable arrangement comprising a sleeve and a cable displaceably guided within said sleeve;

a stationary guide positioned in the vicinity of said first seat track;

said Bowden cable arrangement guided about said stationary guide;

said sleeve connected to said stationary guide;

said cable connected with a first end to the vehicle seat at a fastening location remote from said stationary guide;

said cable transmitting a displacement movement of the vehicle seat onto said slide;

wherein said fastening location and said stationary guide are arranged such to one another that in a first end position of the vehicle seat said cable extends at a first angle of 90° or less to the seat tracks and in a second end position of the vehicle seat extends at a second angle of 0° or more to the seat tracks.

2. A fastening system according to claim 1, wherein said fastening location at the vehicle seat is in the area of said second seat track.

3. A fastening system according to claim 1, wherein said stationary guide is displaceable in a direction defined by said first seat track and is stationarily securable.

4. A fastening system according to claim 1, wherein said stationary guide is open toward said fastening location and is funnel-shaped in order to accommodate positioning of said cable in said first and second end positions and in displacement positions between said first and second end positions.

5. A fastening system according to claim 4, wherein said stationary guide has a shape of a right-angle triangle, wherein one leg of said triangle extends at a right angle to said first seat track and is correlated with an extension of said cable in said first end position and wherein a hypotenuse of said triangle is correlated with an extension of said cable in said second end position.

6. A fastening system according to claim 1, wherein:

said slide extends upwardly and has at an upper end thereof a guide pulley;

said Bowden cable arrangement extends from the vehicle seat to said guide pulley, is guided about said guide pulley and connected to said slide;

said first end position is a forward position of the vehicle seat and said second end position is a rearward position of the vehicle seat, wherein said first angle is 90°; and an angle between said cable and the seat tracks decreases when the vehicle seat is displaced rearwardly into said second end position.

7. A fastening system according to claim 1, wherein:

said slide extends upwardly;

said Bowden cable arrangement extends from the vehicle seat to a lower end of said slide and is connected to said lower end of said slide;

said first end position is a rearward position of the vehicle seat and said second end position is a forward position of the vehicle seat, wherein said first angle is 90°;

an angle between said cable and the seat tracks decreases when the vehicle seat is displaced forwardly into said second end position.

* * * * *